(12) United States Patent
     Mehta

(10) Patent No.: US 10,952,063 B2
(45) Date of Patent: Mar. 16, 2021

(54) METHODS, SYSTEMS, AND COMPUTER READABLE MEDIA FOR DYNAMICALLY LEARNING AND USING FOREIGN TELECOMMUNICATIONS NETWORK MOBILITY MANAGEMENT NODE INFORMATION FOR SECURITY SCREENING

(71) Applicant: Oracle International Corporation, Redwood Shores, CA (US)

(72) Inventor: Vikram Mehta, Greensboro, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 22 days.

(21) Appl. No.: 16/379,488

(22) Filed: Apr. 9, 2019

(65) Prior Publication Data
    US 2020/0329363 A1    Oct. 15, 2020

(51) Int. Cl.
    *H04W 4/00*        (2018.01)
    *H04W 8/10*        (2009.01)
    (Continued)

(52) U.S. Cl.
    CPC .............. *H04W 8/10* (2013.01); *G06N 20/00* (2019.01); *H04L 63/0227* (2013.01);
    (Continued)

(58) Field of Classification Search
    CPC ........... H04W 8/10; H04W 8/04; H04W 8/26; G06N 20/00; H04L 63/0227; H04L 63/101
    (Continued)

(56) References Cited

U.S. PATENT DOCUMENTS

| 6,091,958 A | 7/2000 | Bergkvist et al. |
| 6,151,503 A | 11/2000 | Chavez |

(Continued)

FOREIGN PATENT DOCUMENTS

| CN | 101917698 A | 12/2010 |
| CN | 103179504 A | 6/2013 |

(Continued)

OTHER PUBLICATIONS

Non-Final Office Action for U.S. Appl. No. 16/100,172 (dated Mar. 6, 2020).

(Continued)

*Primary Examiner* — Mang Hang Yeung
(74) *Attorney, Agent, or Firm* — Jenkins, Wilson, Taylor & Hunt, P.A.

(57) ABSTRACT

A method for dynamically learning and using foreign mobility management node information for telecommunications network security screening includes operating a telecommunications network routing node in a learn mode in which traffic from foreign mobility management nodes is received and identities of the foreign mobility management nodes are learned and used to populate a security database maintained by the telecommunications network routing node. The method further includes operating the telecommunications network routing node in a test mode to dynamically learn foreign mobility management node security status and maintaining the security status for the foreign mobility management nodes in the security database. The method further includes operating the telecommunications network routing node in an active mode to filter traffic from the foreign mobility management nodes using the dynamically learned node identities and security statuses.

18 Claims, 5 Drawing Sheets

(51) Int. Cl.
    *G06N 20/00*     (2019.01)
    *H04L 29/06*     (2006.01)
    *H04W 8/04*     (2009.01)
    *H04W 8/26*     (2009.01)

(52) U.S. Cl.
    CPC ............. *H04L 63/101* (2013.01); *H04W 8/04* (2013.01); *H04W 8/26* (2013.01)

(58) Field of Classification Search
    USPC ....................................................... 370/329
    See application file for complete search history.

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,615,217 B2 | 12/2013 | Ravishankar et al. |
| 8,879,431 B2 | 11/2014 | Ridel et al. |
| 9,015,808 B1* | 4/2015 | Koller ................... H04L 63/105 726/4 |
| 9,060,263 B1 | 6/2015 | Carames et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 10,021,738 B1 | 7/2018 | Mehta et al. |
| 10,212,538 B2 | 2/2019 | Russell |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,616,200 B2 | 4/2020 | Kumar et al. |
| 2001/0046856 A1 | 11/2001 | McCann |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0174082 A1 | 7/2007 | Singh |
| 2007/0281718 A1 | 12/2007 | Nooren |
| 2008/0004047 A1 | 1/2008 | Hill et al. |
| 2008/0026778 A1 | 1/2008 | Cai et al. |
| 2008/0045246 A1 | 2/2008 | Murtagh et al. |
| 2008/0051061 A1* | 2/2008 | Takahashi ......... H04W 12/0602 455/411 |
| 2008/0125116 A1 | 5/2008 | Jiang |
| 2008/0207181 A1 | 8/2008 | Jiang |
| 2008/0222038 A1 | 9/2008 | Eden |
| 2009/0045251 A1 | 2/2009 | Jaiswal et al. |
| 2009/0195349 A1 | 8/2009 | Frader-Thompson et al. |
| 2010/0062789 A1 | 3/2010 | Agarwal et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0307381 A1 | 12/2011 | Kim et al. |
| 2012/0099715 A1 | 4/2012 | Ravishankar et al. |
| 2012/0131121 A1 | 5/2012 | Snyder et al. |
| 2012/0203663 A1 | 8/2012 | Sinclair et al. |
| 2012/0207015 A1 | 8/2012 | Marsico |
| 2013/0171988 A1 | 7/2013 | Yeung et al. |
| 2013/0331063 A1 | 12/2013 | Cormier et al. |
| 2014/0199961 A1 | 7/2014 | Mohammed et al. |
| 2014/0280645 A1 | 9/2014 | Shuman et al. |
| 2014/0378129 A1 | 12/2014 | Jiang et al. |
| 2015/0012415 A1 | 1/2015 | Livne et al. |
| 2015/0094060 A1 | 4/2015 | Kouridakis et al. |
| 2015/0188979 A1 | 7/2015 | Almeras et al. |
| 2016/0088461 A1 | 3/2016 | Jiang |
| 2016/0156647 A1 | 6/2016 | Engel et al. |
| 2016/0165432 A1 | 6/2016 | Dubesset et al. |
| 2016/0269566 A1 | 9/2016 | Gundamaraju et al. |
| 2016/0292687 A1 | 10/2016 | Kruglick |
| 2017/0345006 A1 | 11/2017 | Kohli |
| 2018/0020324 A1 | 1/2018 | Beauford |
| 2018/0109953 A1 | 4/2018 | He |
| 2018/0167906 A1 | 6/2018 | Chellamani et al. |
| 2018/0205698 A1 | 7/2018 | Gupta et al. |
| 2018/0310162 A1 | 10/2018 | Kim et al. |
| 2019/0007788 A1 | 1/2019 | Russell |
| 2019/0044932 A1 | 2/2019 | Kumar et al. |
| 2020/0007538 A1 | 1/2020 | Mehta |
| 2020/0053044 A1 | 2/2020 | Mahalank et al. |

FOREIGN PATENT DOCUMENTS

| | | |
|---|---|---|
| CN | 104 800 664 A | 3/2018 |
| EP | 1 067 492 A2 | 1/2001 |
| EP | 1 906 682 A1 | 4/2008 |
| EP | 2 204 955 A1 | 7/2010 |
| EP | 3 493 569 A1 | 6/2019 |
| WO | WO 2005/091656 A1 | 9/2005 |
| WO | WO 2005/101872 A1 | 10/2005 |
| WO | WO 2007/084503 A2 | 7/2007 |
| WO | WO 2010/045646 A2 | 4/2010 |
| WO | WO 2010/105099 A2 | 9/2010 |
| WO | WO 2011/047382 A2 | 4/2011 |
| WO | WO 2016/201990 A1 | 12/2016 |
| WO | WO 2019/005287 A1 | 1/2019 |
| WO | WO 2019/027813 A1 | 2/2019 |
| WO | WO 2020/013889 A1 | 1/2020 |
| WO | WO 2020/033113 A1 | 2/2020 |

OTHER PUBLICATIONS

Notice of Allowance and Fee(s) Due and Examiner-Initiated Interview Summary for U.S. Appl. No. 15/666,300 (dated Feb. 13, 2020).

Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpubllshed, filed Dec. 31, 2019).

Advisory Action and Applicant-Initiated Interview Summary for U.S. Appl. No. 16/100,172 (dated Dec. 20, 2019).

Notification of Transmittal of the International Search Report and the Written Opinion of the International Searching Authority, or the Declaration for International Application Serial No. PCT/US2019/042203 (dated Nov. 11, 2019).

Applicant-Initiated Interview Summary for U.S. Appl. No. 15/666,300 (dated Oct. 29, 2019).

Final Office Action for U.S. Appl. No. 16/100,172 (dated Oct. 3, 2019).

"Technical Specification Group Core Network and Terminals; Evolved Packet System (EPS); Mobility Management Entity (MME) and Serving GPRS Support Node (SGSN) related interfaces based on

(56) References Cited

OTHER PUBLICATIONS

Diameter protocol (Release 16)," 3GPP TS 29.272, V16.0.0, pp. 1-180 (Sep. 2019).
"Technical Specification Group Core Network and Terminals; Policy and Charging Control (PCC); Reference points (Release 16)," 3GPP TS 29.212, V16.1.0, pp. 1-285 (Sep. 2019).
Notification of Transmittal of the International Search Report and the Written Opinion of the International Searching Authority, or the Declaration for International Application Serial No. PCT/US2019/028814 (dated Aug. 20, 2019).
Applicant-Initiated Interview Summary for U.S. Appl. No. 16/100,172 (dated Jul. 18, 2019).
Notice of Allowance and Fee(s) Due and Examiner-Initiated Interview Summary for U.S. Appl. No. 15/376,631 (dated Jul. 2, 2019).
"Technical Specification Group Core Network and Terminals; Mobile Application Part (MAP) specification (Release 15)," 3GPP TS 29.002, V15.5.0, pp. 1-1024 (Jun. 2019).
Non-Final Office Action for U.S. Appl. No. 15/666,300 (dated Jun. 27, 2019).
Decisison on Appeal for U.S. Appl. No. 13/047,287 (dated Jun. 18, 2019).
Notification of Transmittal of the International Search Report and the Written Opinion of the International Searching Authority, or the Declaration for International Patent Application No. PCT/US2019/018990 (dated May 8, 2019).
Non-Final Office Action for U.S. Appl. No. 16/100,172 (dated Apr. 11, 2019).
Notice of Allowability for U.S. Appl. No. 16/035,008 (dated Mar. 18, 2019).
Notice of Allowance and Fee(s) Due for U.S. Appl. No. 16/035,008 (dated Jan. 18, 2019).
Advisory Action Before the Filing of an Appeal Brief and AFCP 2.0 Decision for U.S. Appl. No. 15/376,631 (dated Dec. 19, 2018).
Notice of Allowance and Fee(s) Due and Applicant-Initiated Interview Summary for U.S. Appl. No. 15/408,155 (dated Oct. 31, 2018).
Notification of Transmittal of the International Search Report and the Written Opinion of the International Searching Authority, or the Declaration for International Patent Application No. PCT/US2018/043985 (dated Oct. 9, 2018).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for International Application No. PCT/US2018/030319 (dated Aug. 20, 2018).
Final Office Action for U.S. Appl. No. 15/408,155 (dated Jul. 26, 2018).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
"Signalling Security in Telecom SS7/Diameter/5G," Enisa, (Mar. 2018) pp. 1-30.
Examiner's Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
"GSMA Guidelines for Diameter Firewall," NetNumber Inc., (Sep. 12, 2017) pp. 1-7.
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9)," ETSI TS 129 172, v9.6.0, pp. 1-27 (Apr. 2015).
Non-Final Office Action for U.S. Appl. No. 13/047,287 (dated Sep. 25, 2014).
Supplemental Notice of Allowance and Fee(s) Due for U.S. Appl. No. 12/823,55S (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stage1 (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).

(56) References Cited

OTHER PUBLICATIONS

Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"NET-NET Diameter Director" http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Notification of Transmittal of the Internatioanl Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/US2009/061187 (dated May 17, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
Notice of Allowance and Fee(s) Due and Examiner-Initiated Interview Summary for U.S. Appl. No. 16/100,172 (dated Sep. 14, 2020).
Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
Notification of Transmittal of the International Search Report and the Written Opinion of the International Searching Authority, or the Declaration for International Application No. PCT/US2020/024234 (dated Jul. 16, 2020).
Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
Non-Final Office Action for U.S. Appl. No. 16/024,422 (dated Jul. 8, 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).
Applicant-Initiated Interview Summary for U.S. Appl. No. 16/100,172 (dated Jun. 9, 2020).
"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).
"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).
Communication of European publication number and information on the application of Article 67(3) EPC for European Application Serial No. 18731923.1 (dated Apr. 8, 2020).
"3rd Generation Partnership Project; Technical Specification Group Services and System Aspects; Security architecture and procedures for 5G system (Release 16)," 3GPP TS 33.501, V16.2.0, pp. 1-227 (Mar. 2020).
"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).
"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).
"FS.19 Diameter Interconnect Security," GSMA, pp. 1-3 (Dec. 20, 2019).
Sahu et al., "How 5G Registration Works," http://5gblogs.com/5g-registration/, 10 pages (Oct. 12, 2018).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).

(56) References Cited

OTHER PUBLICATIONS

"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).

Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).

Notice of Allowance and Fee(s) Due and Examiner-Initiated Inteview Summary for U.S. Appl. No. 16/024,422 (dated Oct. 21, 2020).

"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).

"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).

3rd Generation Partnership Project; Technical Specification Group Services and System Aspects; Procedures for the 5G System (5GS); Stage 2 (Release 16), 3GPP TS 23.502, v16.6.0, pp. 1-597 (Sep. 2020).

\* cited by examiner

METHODS, SYSTEMS, AND COMPUTER READABLE MEDIA FOR DYNAMICALLY LEARNING AND USING FOREIGN TELECOMMUNICATIONS NETWORK MOBILITY MANAGEMENT NODE INFORMATION FOR SECURITY SCREENING

TECHNICAL FIELD

The subject matter described herein relates to telecommunications network security. More particularly, the subject matter described herein relates to dynamically learning foreign telecommunications network mobility management node information, automatically provisioning a telecommunications network security database using the learned foreign mobility management network node information, and screening live traffic using the learned foreign mobility management node information.

BACKGROUND

Telecommunications networks are vulnerable to different types of attacks, such as location tracking, call and short message service (SMS) intercepting, account fraud, denial-of-service, etc. Some of the attacks relate to vulnerabilities in the SS7 and Diameter protocols used by 2G, 3G, 4G, and 5G networks. Many types of attacks seek to obtain subscriber information by masquerading as a valid network node to obtain the information. For example, in an SS7 network, attackers masquerading as a visitor location register (VLR)/mobile switching center (MSC) can obtain subscriber information from a home location register (HLR). In Diameter networks, an attacker masquerading as a mobility management entity (MME) can obtain subscriber information from a home subscriber server (HSS). Attackers masquerading as a foreign HLR or HSS can also obtain subscriber information.

To counter these types of network attacks, the Global System for Mobile Communications Association (GSMA) publishes guidelines for remote interconnect security. For example, GSMA documents FS.11 and FS.19 recommend whitelisting known trusted foreign network nodes, such as VLRs, MSCs, MMEs, HLRs, and HSSs to validate traffic arriving at a network from a foreign network and blocking traffic from unknown VLRs, MSCs, MMEs, HLRs, and HSSs. However, creating and maintaining whitelists of such nodes is impractical due to the number of nodes in global communications networks and changes in networks as new nodes are brought into service. For example, when a new node is added to the network, if that node is not present in the database, messages from the node will be discarded even though the node is not implementing a network attack.

Additional types of checks that may be performed include time-based security checks where the time between two different location registrations of a subscriber is compared to what would constitute a reasonable time for the subscriber's mobile device to travel between the locations. If the time is unreasonable, one or the other registrations may be determined to be invalid and associated with a network attack. Like provisioning network node identities in a whitelist, provisioning reasonable times between subscriber registration points manually is undesirable and can lead to erroneous discarding of messages if the travel times are configured incorrectly.

Accordingly, in light of these difficulties, there exists indeed for methods, systems, and computer readable media for dynamically learning and using foreign telecommunications network mobility management node information for security screening.

SUMMARY

A method for dynamically learning and using foreign mobility management node information for telecommunications network security screening includes operating a telecommunications network routing node in a learn mode in which traffic from foreign mobility management nodes is received and identities of the foreign mobility management nodes are learned and used to populate a security database maintained by the telecommunications network routing node. The method further includes operating the telecommunications network routing node in a test mode to dynamically learn foreign mobility management node security status and maintaining the security status for the foreign mobility management nodes in the security database. The method further includes operating the telecommunications network routing node in an active mode to filter traffic from the foreign mobility management nodes using the dynamically learned node identities and security statuses.

According to another aspect of the subject matter described herein, operating the telecommunications network routing node in a learn mode includes querying a home location register (HLR) or home subscriber server (HSS) to identify an old mobility management node and an age of location parameter and populating the security database with an entry corresponding to the old mobility management node and the age of location parameter.

According to yet another aspect of the subject matter described herein, operating the telecommunications network node in the learn mode includes performing validation testing for mobility management node identities extracted from received messages, updating validation pass and fail counts in the security database based on results of the validation testing, and updating the security statuses based on the validation pass and fail counts.

According to yet another aspect of the subject matter described herein, operating the telecommunications network node in the learn mode includes performing validation testing for mobility management node identities extracted from received messages, updating validation pass and fail counts in the security database based on results of the validation testing, and updating the security statuses based on the validation pass and fail counts.

According to yet another aspect of the subject matter described herein, operating the telecommunications network node in the learn mode includes performing validation testing for mobility management node identities extracted from received messages, updating validation pass and fail counts in the security database based on results of the validation testing, and updating the security statuses based on the validation pass and fail counts.

According to yet another aspect of the subject matter described herein, operating the telecommunications network node in the learn mode includes performing validation testing for mobility management node identities extracted from received messages, updating validation pass and fail counts in the security database based on results of the validation testing, and updating the security statuses based on the validation pass and fail counts.

According to yet another aspect of the subject matter described herein, operating the telecommunications network routing node in the learn mode includes dynamically learning time parameters usable for velocity checks between old and new foreign mobility management nodes.

According to yet another aspect of the subject matter described herein, operating the telecommunications network routing node in the active mode includes receiving messages from foreign mobility management nodes, performing lookups in the security database using mobility management node identities extracted from the messages, and blocking or passing the messages based on the dynamically learned security status for the node identities stored in the security database.

According to yet another aspect of the subject matter described herein, the telecommunications network routing node comprises a signal transfer point (STP).

According to yet another aspect of the subject matter described herein, the telecommunications network routing node comprises a Diameter signaling router (DSR).

According to yet another aspect of the subject matter described herein, the method for dynamically learning and using foreign mobility management network node identities includes providing, in the security database, a static profile table for overriding the dynamic learning of foreign mobility management node identities, wherein the routing node routes or blocks messages from foreign mobility management nodes based on the security status stored in the static profile table.

According to yet another aspect of the subject matter described herein, operating the telecommunications network node in the test mode includes dynamically learning the security status of a foreign home location register (HLR) or home subscriber server (HSS).

According to yet another aspect of the subject matter described herein, operating the telecommunications network routing node in the active mode includes using the dynamically learned security of the HLR or HSS to filter traffic from the foreign HLR or HSS.

A system for dynamically learning and using foreign mobility management node information for telecommunications network security screening includes a telecommunications network routing node including at least one processor and a memory. The system further includes a security database located in the memory. The system further includes a dynamic learning and screening module implemented by the at least one processor for operating in a learn mode in which traffic from foreign mobility management nodes is received and identities of the foreign mobility management nodes are learned and used to populate the security database, operating in a test mode to dynamically learn foreign mobility management node security status and maintaining the security status for the foreign mobility management nodes in the security database, and operating in an active mode to filter traffic from the foreign mobility management nodes using the dynamically learned node identities and security statuses.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The subject matter described herein includes a routing node, which may be a gateway STP for SS7 networks or a DSR for Diameter networks, that is capable of dynamically learning foreign mobility management node information and using the dynamically learned foreign mobility management node information to automatically populate a security database that contains the identities of the dynamically learned nodes and classifies the dynamically learned node identities as blacklisted, whitelisted, or graylisted. The dynamically learned node identities can change in security status depending on results of validation testing.

Figure 1:
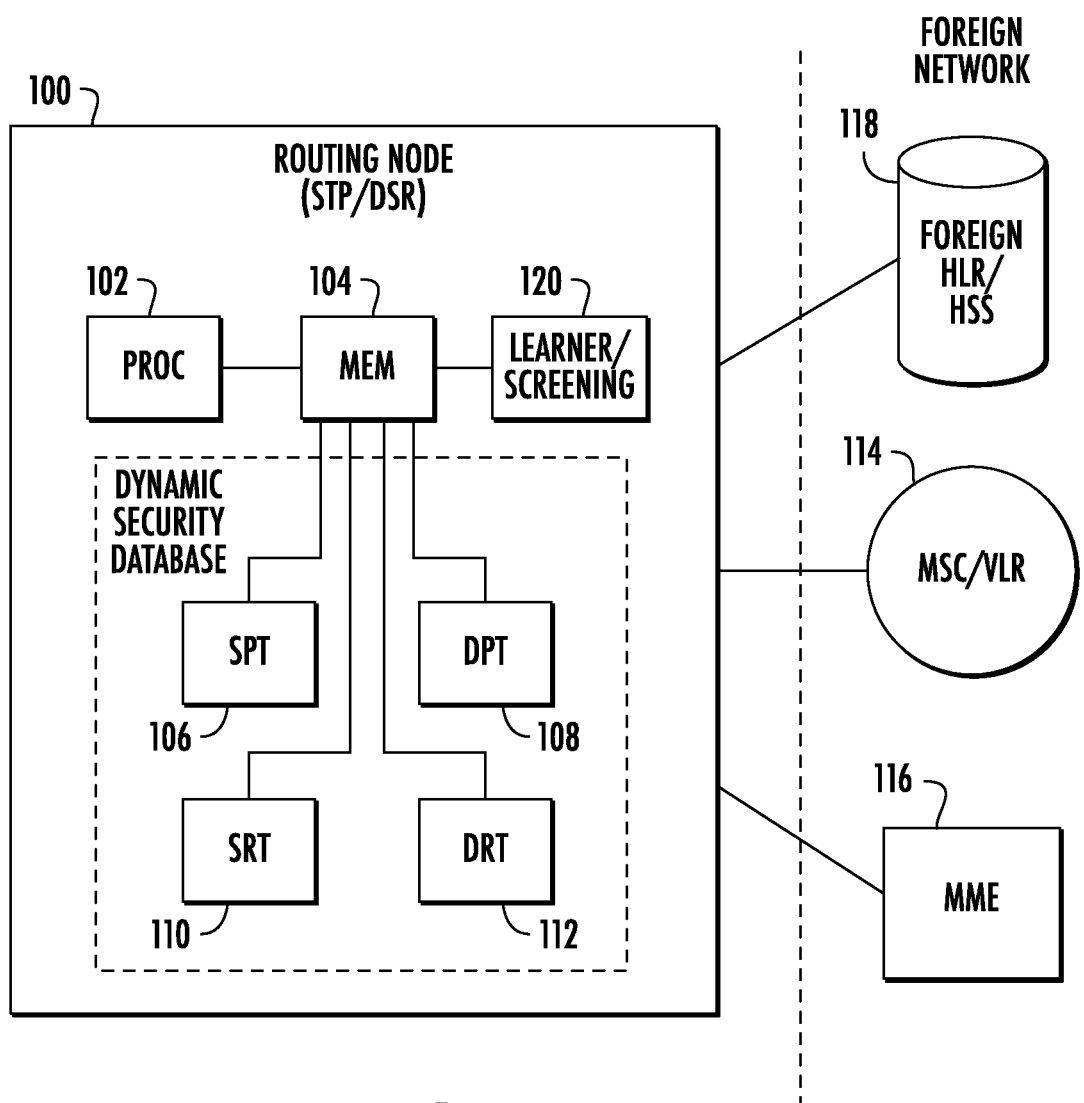
FIG. 1 is a network diagram illustrating a routing node for dynamically learning foreign telecommunications network mobility management node information and automatically provisioning a security database using the learned node information.

FIG. 1 is a block diagram illustrating a routing node, which may be an STP. or DSR, for dynamic learning of foreign mobility management node information and using the dynamically learned node information to populate a security database used by the routing node for screening messages from a foreign network. Referring to FIG. 1, routing node 100 includes at least one processor 102 and a memory 104. Routing node 100 includes a static profile table (SPT) 106 that stores foreign node identities provisioned by the network operator as being blacklisted, whitelisted, or graylisted. Blacklisted or whitelisted entries in SPT 106 will be used to override any dynamic learning or routing decisions. Routing node 100 may also include a dynamic profile table (DPT) 108 containing dynamically learned foreign network node identities and dynamically learned security statuses for each of the learned foreign network node identities.

Routing node 100 may also include a static roaming table (SRT) 110 that includes identities of mobility management nodes and timing information provisioned by the network operator used to perform velocity checks for subscribers moving between network nodes. Routing node 100 further includes a dynamic roaming table (DRT) 112 that stores old and new dynamically learned node identities and time threshold information used to perform velocity checks. The statically provisioned data in SRT 110 may be used to override the dynamic data in DRT 112 when performing the velocity checks.

The combination of static profile table 106, dynamic profile table 108, static roaming table 110, and dynamic roaming table 112 can be considered a telecommunications network security database used by routing node 100 for screening messages from foreign network nodes. The dynamically learned node identities stored in DPT 108 and DRT 112 may be dynamically learned identities of MSC/VLRs, such as MSC/VLR 114, MMEs, such as MME 116, and foreign HLRs or HSSs, such as HLR/HSS 118.

A dynamic learning and screening module 120 populates the entries in DPT 108 and DRT 112 and screens traffic using static and dynamic data in the security database. Dynamic learning and screening module 120 may operate in different modes to learn, test, or screen messages from foreign mobility management nodes. The different modes described herein include off mode, learn mode, test mode, and active mode, each of which will be described in detail below.

As stated above, routing node 100 may dynamically learn identities of foreign nodes and create new entries in dynamic profile table 108 for the new node identities. A new entry is an entry for which no rule is provisioned in static profile table 106 that classifies the new identity as whitelisted or blacklisted. If there is no entry for an HLR, HSS, MSC/VLR or MME in static profile table 106 where the node is classified as blacklisted or whitelisted, the node identity is considered as new and is dynamically learned by adding an entry to dynamic profile table 108. The dynamically learned node identity will initially be classified as graylisted and may subsequently be classified as whitelisted, blacklisted, or graylisted, depending on results of validation testing, which will be described in detail below.

As stated above, dynamic learning and screening module 120 of routing node 100 may be capable of operating in different modes with respect to dynamic learning. These modes are as follows:

Off mode: No dynamic learning is performed; messages are allowed or blocked based on configured rules in static profile table 106 and dynamic profile table 108;

Learn mode: Learn new mobility management node identities; validation testing of newly learned nodes is not performed; classify all newly learned node identities as whitelisted;

Test mode: Learn new mobility management node identities; perform validation testing of newly learned mobility management nodes; keep the status of newly learned nodes as graylisted; continue to forward all traffic from newly learned nodes regardless of whether status of node is blacklisted, whitelisted, or graylisted;

Active mode: Perform validation testing of newly learned foreign mobility management nodes in dynamic profile table 108; change status of newly learned nodes from graylisted to whitelisted or blacklisted based on results of validation testing; disable dynamic learning of new foreign mobility management nodes; discard messages received from node identities for which entries are provisioned in static profile table 106 or dynamic profile table 108 where the rule indicates that the status is blacklisted; forward messages received from node identities for which entries are provisioned in static profile table 106 or dynamic profile table 108 where the rule indicates that the status is whitelisted or graylisted.

Providing a routing node with the capability of operating in the above-described modes enables network operators to dynamically learn the identities of during repeated validation testing.

According to another aspect of the subject matter described herein, dynamically learned foreign mobility management node identities may not be whitelisted or blacklisted based on single validation test results. Rather, validation tests are repeatedly performed as traffic is received from the nodes and successful and unsuccessful validation test results are counted. Thresholds are defined for unsuccessful and successful validation test results. According to one aspect of the subject matter described herein, a network operator may configure the following thresholds in routing node 100, and routing node 100 may use the thresholds to determine when a foreign mobility management node should be marked as whitelisted or blacklisted in dynamic profile table 108:

Successful validation threshold [Range: "None" or 1–MAX_INT32, Default "None"]
"None" indicates that the mobility management node should not be whitelisted.
When the count of successful validations for a newly learned foreign mobility management node identity reaches this threshold, dynamic learning and screening module 120 changes the status of the mobility management node to whitelisted in dynamic profile table 108.

Failed validation threshold [Range: "None" or 1–MAX_INT32, Default "None"]
"None" indicates this VLR should not be blacklisted.
When the count of unsuccessful validations for a newly learned foreign mobility management node identity reaches this threshold, dynamic learning and screening module 120 changes the status of the mobility management node to blacklisted in dynamic profile table 108.

For each dynamically learned mobility management node identity stored in dynamic profile table 108, dynamic learning and screening module 120 maintains counts of successful validations and unsuccessful validations. Dynamic learning and screening module 120 increments the successful validation count when validation testing results in a success. Dynamic learning and screening module 120 increments the failed validation count when validation testing results in failure. As indicated above, the validation counts are compared to the successful and failed validation thresholds to determine whether a given mobility management node identity in dynamic profile table 108 should be marked as blacklisted or whitelisted. Thus, using repeated testing and the above-described successful and failed validation thresholds, routing node 100 dynamically learns the security statuses of new foreign mobility management nodes.

Figure 2:
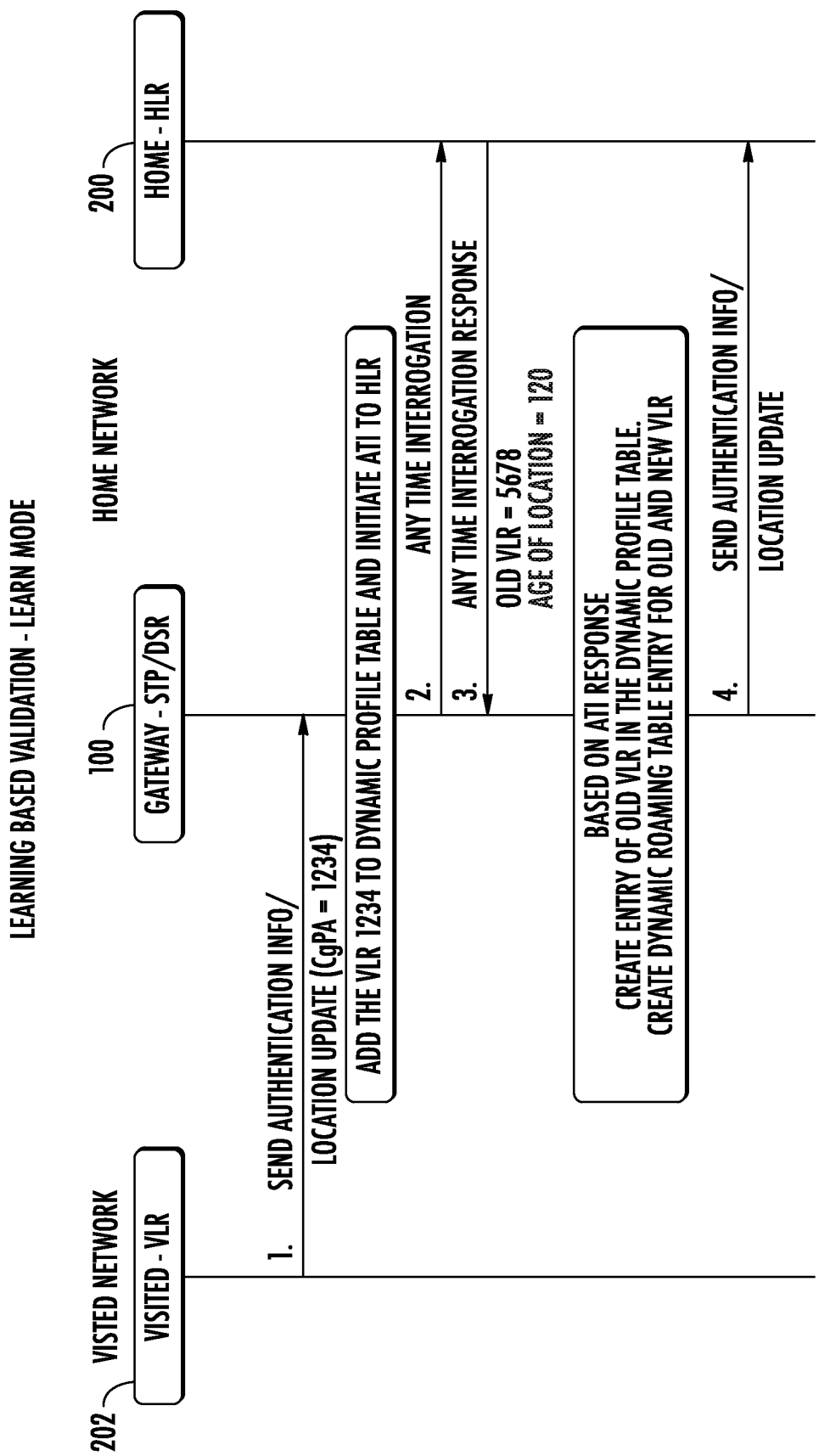
FIG. 2 is a message flow diagram illustrating a learn mode of operation of the routing node illustrated in FIG. 1 for dynamically learning foreign mobility management node information and automatically provisioning a security database using the learned node information.

FIG. 2 is a message flow diagram illustrating learning based validation of a foreign VLR when routing node 100 operates in learn mode. Referring to FIG. 2, routing node 100 resides in a home network including a home HLR 200. A VLR 202 located in visited network attempts to send traffic to the home network via routing node 100. In the illustrated example, in line 1 of the message flow diagram, VLR 202 located in the visited network sends a send authentication information message or a location update to the home network via routing node 100. Because routing node 100 is operating in learn mode, routing node 100 adds the identity of VLR 202 to dynamic profile table 108. Validation testing is not performed, the status of the new entry in dynamic profile table 108 is set to graylisted, and the validation pass count is incremented. The first row in Table 1 shown below is an example of the added entry to dynamic profile table 108.

TABLE 1

Dynamic Profile Table

| Address | Security Status | Validation Pass Count | Validation Fail Count |
|---|---|---|---|
| 1234 | GL | 1 | |
| 5678 | GL | | |

In Table 1, the first row corresponds to the new entry created for the VLR having the identity 1234. The status of the new entry is set to GL or graylisted.

In line 2 of the message flow diagram, after adding an entry corresponding to VLR 1234 to the dynamic profile table, routing node 100 transmits an anytime interrogation message to HLR 200. In line 3, HLR 200 responds with an anytime interrogation response that lists the old VLR ID for the subscriber and age of location to be 120. The old VLR ID is the ID of the VLR where the subscriber identified in the anytime interrogation message was most recently registered. The age of location is the elapsed time since the last registration at the old VLR ID.

Based on the ATI response, routing node 100 creates an entry of the old VLR in the dynamic profile table and creates a dynamic roaming table entry for the old and new VLR. The second row in Table 1 above is an example of the entry for the old VLR having the identity 5678 that may be added to the dynamic profile table. Table 2 shown below illustrates an example of the dynamic roaming table populated with the information of the old and new VLR for the example in FIG. 2.

TABLE 2

Dynamic Roaming Table

| Old VLR Address | New VLR Address | Time Threshold | Learning Counter | Status Learn/Validate |
|---|---|---|---|---|
| 5678 | 1234 | 120 | 1 | Learn |

In Table 2, routing node 100 creates an entry with the old and new VLR addresses, a time threshold, a learning counter, and a status field. The time threshold recorded in Table 2 is the minimum recorded time between registrations at the old VLR address and the new VLR address in the entry for whitelisted VLRs only. The learning of time thresholds for messages received from graylisted or blacklisted VLRs is not performed, as doing so could allow attackers to set invalid minimum threshold values. The data in Table 2 may be used to perform velocity validation of messages related to roaming mobile subscribers, as will be described in more detail below.

Returning to the flow diagram in FIG. 2, in line 4, routing node 100 sends a send authentication information/location update message to home HLR 200. Line 4 reflects the passing of the received message to its destination, which is performed for all messages received when operating in the learn mode.

Figure 3:
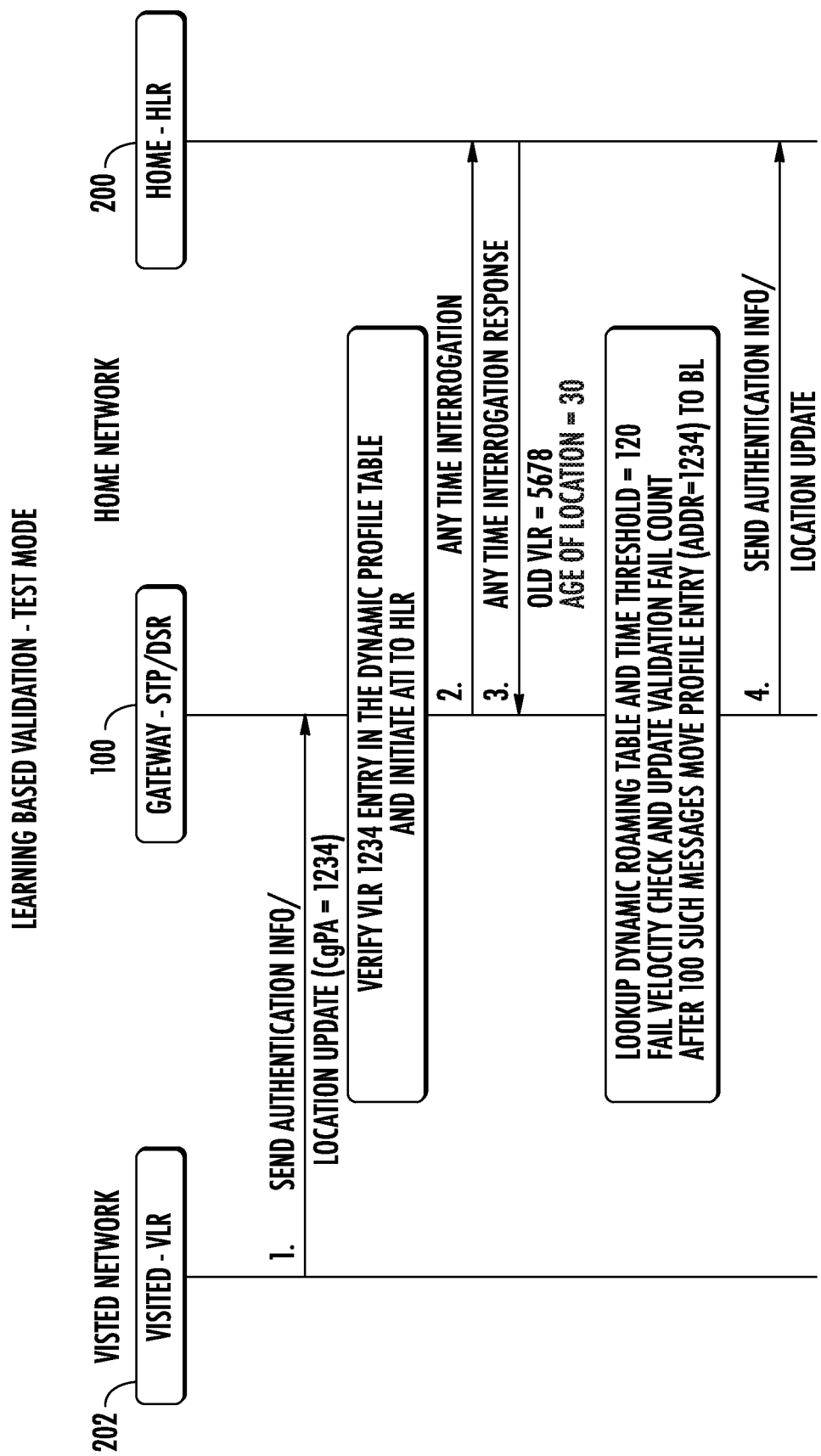
FIG. 3 is a message flow diagram illustrating a test mode of operation of the routing node illustrated in FIG. 1 in which validation pass and fail counts are updated in response to successful and unsuccessful validations of messages from foreign mobility management nodes.

FIG. 3 is a message flow diagram illustrating exemplary steps that may be performed by routing node 100 when operating in the test mode. As stated above, in the test mode, node validation is performed but messages are still forwarded to the home HLR regardless of the results of the validation testing. Referring to FIG. 3, in line 1, visited VLR 202 sends a send authentication information or location update request message to routing node 100. Routing node 100 verifies that there is an entry in dynamic profile table 108 corresponding the VLR ID and sends an anytime interrogation message to home HLR 200. In line 3 of the message flow diagram, home HLR 200 responds with an ATI response message containing the old VLR ID and the age of location since the user was last registered at that ID. Upon receiving the old VLR and age of location, routing node 100 performs a lookup in the dynamic roaming table to determine whether a velocity check for the subscriber passes or fails. In this case, the time threshold for the velocity check is 120 and the age of location is 30. Because the age of location indicates the time between VLRs and the threshold is 120, the velocity check fails. When the velocity check fails, routing node 100 updates the validation fail count in dynamic profile table 108. Table 3 below illustrates the status of dynamic profile table 108 after 100 failed validations.

TABLE 3

Dynamic Profile Table After Failed Validations

| Address | Security Status | Validation Pass Count | Validation Fail Count |
|---|---|---|---|
| 1234 | BL | 1 | 100 |
| 5678 | GL | | |

In Table 3, it is indicated that validation of the VLR 1234 has failed 100 times. Accordingly, routing node 100 may change the status of the VLR to blacklist or BL. However, because routing node 100 is operating in test mode, traffic will continue to be forwarded.

Routing node 100 may also update the learning counter in the dynamic roaming table. Table 4 is an example of the dynamic roaming table after 101 validation tests for a given entry.

TABLE 4

Dynamic Roaming Table After Validation Updates

| Old VLR Address | New VLR Address | Time Threshold | Learning Counter | Status Learn/Validate |
|---|---|---|---|---|
| 5678 | 1234 | 120 | 101 | Validate |

In the dynamic roaming table entry in Table 4, the learning counter is updated to indicate that 101 learning transactions have been performed. The status field is set to validate to indicate that validation testing is being performed.

Returning to FIG. 3, in line 2 of the message flow diagram, routing node 100 sends an anytime interrogation message to HLR 200. In line 3, HLR 200 responds with an anytime interrogation response including the old VLR ID of 5678 and an age of location parameter of 30. Routing node 100 performs a lookup in the dynamic roaming table and determines that the velocity check fails because 30 is less than 120. After 100 failed validations, the status of the entry in the dynamic profile is set to blacklisted. In line 4 of the message flow diagram, routing node 100 sends a send authentication information/location update message to home HLR 200. Thus, in test mode, even though the status of an entry is changed to blacklisted, messages from foreign networks may continue to be forwarded to home network nodes.

In test mode it should also be noted that new entries are added to the dynamic profile table with graylisted status. Validation pass and fail counts are updated based on results of the validation testing, which in this instance involves a velocity check. Dynamic profile table entries are updated with learn counts based on the number of successful and unsuccessful validations performed. New entries are created in the dynamic roaming table. In the new entries in the dynamic roaming table, the time threshold is updated with the minimum threshold of all of the age of location values in received ATI response messages from home HLR 200 for the particular VLR, provided that the VLR is whitelisted. Updating the time threshold with the minimum value encountered in age of location parameters for a whitelisted VLR avoids the need for manually determining a reasonable time threshold to include in a velocity check.

Figure 4:
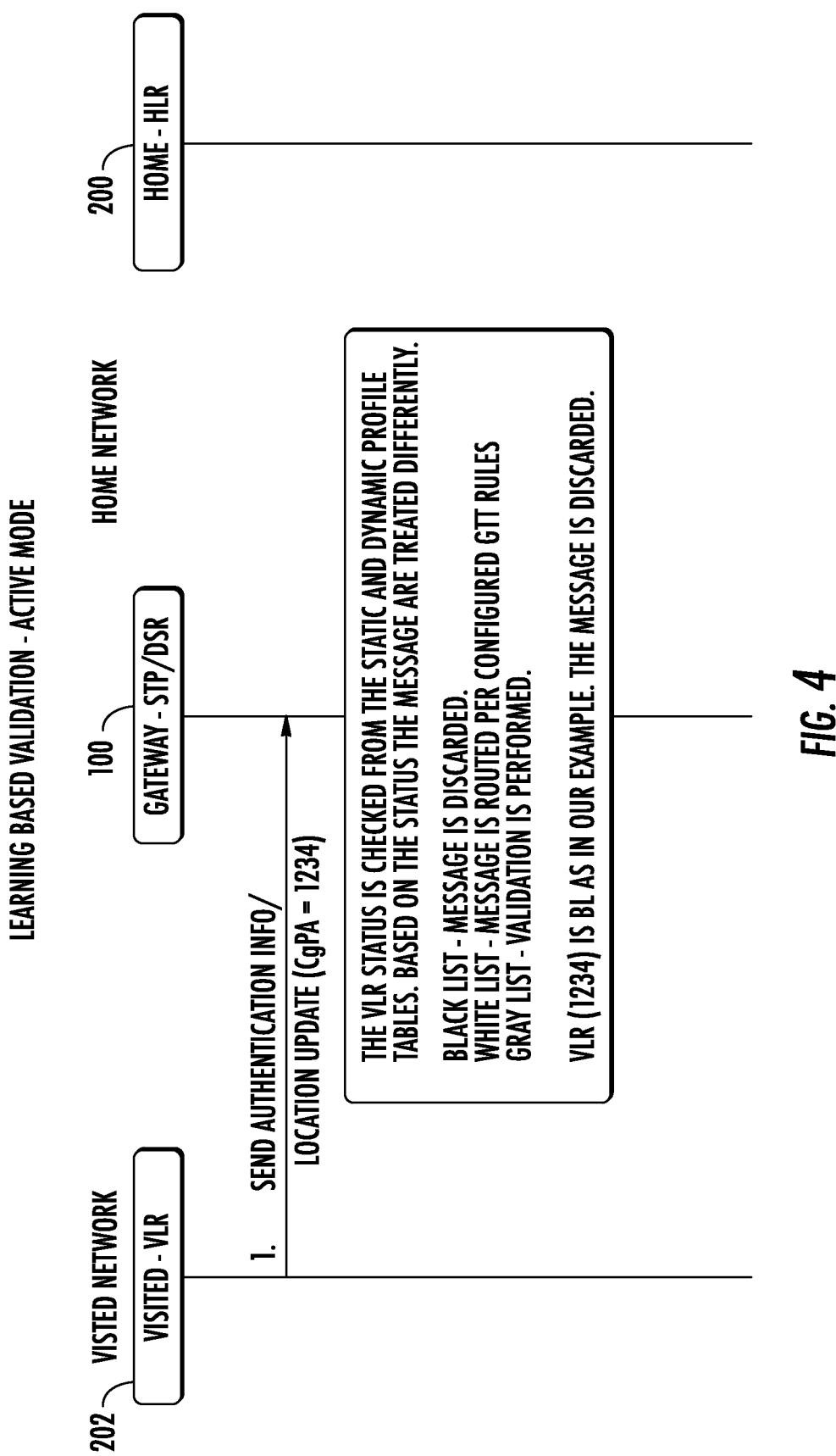
FIG. 4 is a message flow diagram illustrating an active node of operation of the routing node illustrated in FIG. 1 in which new entries are not added to a dynamic profile table, validation pass and fail counts are updated, mobility management node security status is updated, and messages are passed or discarded based on dynamically learned node security status.

FIG. 4 is a message flow diagram illustrating exemplary operation of routing node 100 when operating in active mode. As stated above, in active mode, validation testing is performed but new entries are not created in dynamic profile table with graylisted status. Validation counts (pass and fail) are updated. Dynamic profile table entries may be changed to whitelisted or blacklisted status permanently based on the validation counts. Once velocity learning is completed, messages from a VLR with a failed validation may be discarded based on the VLR being classified as blacklisted.

Referring to the message flow in FIG. 4, in line 1, VLR 202 sends a send authentication information or location update request message to routing node 100. Routing node 100 performs a VLR security status check using the data stored in the static and dynamic profile tables. Performing the VLR security status check may include performing a lookup in the static and dynamic profile tables using the VLR ID 1234. In this example, the configuration of the dynamic profile table is assumed to be the same as that illustrated above in Table 3. Because the security status of the VLR having the ID 1234 is blacklisted, routing node 100 may discard the send authentication information or location update request message. If the security status of the VLR had been whitelisted, the message would have been routed or forwarded to home HLR 200, e.g., based on configured global title translation (GTT) rules. GTT involves translating the global title address stored in the signaling connection control part (SCCP) of the message into a point code and using the point code to route the message to a destination. If the security status had been set to graylisted, validation testing would be performed, and the message would be routed or discarded based on the status of the entry in the dynamic profile table at the conclusion of the validation testing. Thus, in active mode, the dynamically learned entries in the security database can be used by routing node 100 to perform security screening of messages from foreign mobility management network nodes.

Although the message flows in FIG. 1-4 illustrate dynamic learning for SS7 message types. The subject matter described herein is not limited to performing dynamic learning and security screening only for SS7 message. Routing node 100 may also be used to perform dynamic learning and security screening for Diameter messages that are used for the same or similar purposes as the corresponding SS7 messages illustrated in FIGS. 1-4. Rather than receiving the messages from an MSC/VLR, in Diameter networks, the messages used for dynamic learning and security screening may be received from an MME. Rather than querying an HLR for the mobility management node information, routing node 100 would query an HSS in a Diameter network.

Table 5 shown below illustrates an example of interactions between the modes of operation of routing node 100.

TABLE 5

Interactions Between Different Operational Modes of Routing Node

| Static Status | Dynamic Status | Overall VLR Status | Mode "OFF" | Learn Mode | Test Mode | Active Mode |
|---|---|---|---|---|---|---|
| WL (Complete or Partial) | DC | WL | Validation Success | Validation Success Create dynamic entry if entry does not exist | Validation Success Create dynamic entry if entry does not exist | Validation Success Do not create dynamic entry |
| BL (Complete or Partial) | DC | BL | Validation Failed | Validation Failed Do not create dynamic entry | -Validation Failed -Do not create dynamic entry | Validation Failed Do not create dynamic entry |
| GL (Complete or Partial) | DC | GL | Challenge VLR | Challenge VLR Create dynamic entry if entry does not exist | -Challenge VLR -Create dynamic entry if entry does not exist | Challenge VLR Do not create dynamic entry |
| Does Not Exist | Does Not Exist | GL | Challenge VLR | Validation Success for CAT3.1 messages. | Challenge VLR Create dynamic | Challenge VLR Do not create |

TABLE 5-continued

Interactions Between Different Operational Modes of Routing Node

| Static Status | Dynamic Status | Overall VLR Status | Mode "OFF" | Learn Mode | Test Mode | Active Mode |
|---|---|---|---|---|---|---|
| | | | | Challenge VLR for CAT3.2 messages Create Dynamic entry | entry Update success & failure counts based on challenge results Thresholds does not apply, VLR remains in GL | dynamic entry |
| Does Not Exist | WL | WL | Not applicable | Validation Success | Validation Success | Validation Success |
| | BL | BL | Not applicable | Validation Failed | Validation Failed | Validation Failed |
| | GL | GL | Not applicable | Validation Success for CAT3.1 messages. Challenge VLR for CAT3.2 messages. | Challenge VLR Update success & failure counts based on challenge results Count Thresholds does not apply, VLR remains in GL UIMs are however raised (for status changed). | Challenge VLR Update success & failure counts based on challenge results Move VLR to WL/GL when count threshold reached UIMs are raised for status change |

In the first row of Table 5, if the static status of a VLR is whitelisted, the dynamic status of the VLR (or other foreign mobility management node) is don't care or DC. The terms "complete or partial" in column 1 of Table 5 refer to a complete or partial match on the VLR identity extracted from a received signaling message. In the first row, the overall node status is whitelisted. In all of the modes of operation, a received message from the particular VLR is treated as a validation success. In learn and test modes, a dynamic entry for the VLR is created. In active and off modes, dynamic entries are not created.

In the second row of Table 5, if the static status of a network node is blacklisted, the dynamic status is don't care. The overall status of the node is blacklisted. In all of the modes of operation, the receipt of a message from a network node whose static status is blacklisted is treated as a validation failure. Dynamic entries are not created in any of the operational modes.

In the third row of Table 5, if the static status of a network node is graylisted, the dynamic status is don't care, and the overall status is graylisted. In all of the modes of operation, validation testing is performed. In the learn and test modes, dynamic entries are created. In the active and off modes, dynamic entries are not created.

In the fourth row of Table 5, if the static status of a VLR or other network node does not exist, and the dynamic status likewise does not exist, the overall VLR status is set to graylisted. In the off, test, and active modes, validation testing is performed. Validation testing may also be performed in the learn mode for certain categories of messages and not for other categories of messages. In particular, Category 3.1 messages are treated as a validation success and are passed without validation testing. Category 3.2 messages are treated as a validation failure. Category 3.1 and 3.2 messages are defined by the GSMA in the above-referenced FS.11 and FS.19 documents. A current list of Category 3.1 messages is illustrated below in Table 6:

TABLE 6

| Category 3.1 Messages | |
|---|---|
| Operation Name | Opcode Value |
| sendParameters | 9 |
| MAP_REGISTER_SS | 10 |
| MAP_ERASE_SS | 11 |
| MAP_ACTIVATE_SS | 12 |
| MAP_DEACTIVATE_SS | 13 |
| MAP_INTERROGATE_SS | 14 |
| MAP_REGISTER_PASSWORD | 17 |
| processUnstructuresSS-Data | 19 |
| beginSubscriberActivity | 54 |
| MAP_RESTORE_DATA | 57 |
| MAP_PROCESS_UNSTRUCTURED_SS_REQUEST | 59 |
| MAP_PURGE_MS | 67 |

In Table 6, the first column indicates the operation name, and the second column contains the transaction capabilities application part (TCAP) opcode value that identifies the operation in the message.

Table 7 shown below illustrates a current listing of Category 3.2 messages.

TABLE 7

| Category 3.2 Messages | |
|---|---|
| Operation Name | Opcode Value |
| MAP_UPDATE_LOCATION | 2 |
| UPDATE_GPRS_LOCATION | 23 |
| SEND_AUTHENTICATION_INFO | 56 |

Returning to the description of the fourth row of Table 5, in the learn mode, a dynamic table entry is created. In the test mode, dynamic entries are created, and counts are updated. In the active mode, dynamic entries are not created.

In the fifth row of column 1 of Table 5, if the static status does not exist and the dynamic status is whitelisted, blacklisted, or graylisted, the overall status corresponds to the dynamic status of whitelisted, blacklisted, or graylisted. In the off mode, validation testing is not performed regardless of the overall dynamic status. In the learn mode, if the VLR is whitelisted, the message is treated as a validation success. If the VLR is blacklisted, the message is treated as a validation failure. If the VLR is graylisted, the message will be indicated as a validation success for certain categories of messages and testing will be performed for other categories. In the test mode, a whitelisted VLR is treated as a validation success, a blacklisted VLR is treated a validation failure, and a graylisted VLR results in validation testing be performed and counts being updated. In the active mode, a whitelisted VLR is treated as a validation success, a blacklisted VLR is treated as a validation failure, and a graylisted VLR is treated as requiring validation testing where success and failure counts are updated based on results of the validation testing.

Table 8 shown below illustrates operations of routing node 100 when transitioning between operational modes.

TABLE 8

| Operational Mode Transitions | | | | |
|---|---|---|---|---|
| New Mode -> Old Mode | OFF | Learn | Test | Active |
| OFF | | None | None | None |
| Learn | Delete all dynamic entries | | None | None |
| Test | Delete all dynamic entries | Delete dynamic entries without parent in static | | None |
| Active | Delete all dynamic entries | Delete dynamic entries without parent in static | None | |

In Table 8, the diagonal represents cases where no mode change occurs, so no additional action relating to mode transition is needed. For example, in the first row of the first column, the old mode is off, and the new mode is off. Since no mode transition occurs, no action relating to a mode transition is needed.

Referring to the second row in Table 8, if the current mode is learn, and the new mode is off, routing node 100 may delete all the dynamic entries. If the current mode is learn, and the next mode is test or active, no additional action is required.

Referring to the third row in Table 8, if the current mode is test and the new mode is off, all dynamic entries are deleted. If the current mode is test and the new mode is learn, dynamic entries are deleted that do not have parent entries in the static profile table. If the current mode is test and the new mode is active, no additional action is required.

Referring to the fourth row in Table 8, if the current mode is active and the new mode is off, all dynamic entries are deleted. If the current mode is active and the new mode is learn, dynamic entries that do not have parents in the static profile table are deleted. If the current mode is active and the new mode is test, no further action is required.

According to the subject matter described herein, the mode of routing node 100 with respect to dynamic foreign mobility management node learning may be configurable by setting a value in a table maintained in memory of routing node 100. The default mode may be set to off. Similarly, the success and failure thresholds used in determining the status of a node may be configurable with the default value of none. If the default values change during operation of routing node 100, the new threshold values will be taken into effect for graylisted dynamic VLRs or other nodes when in active mode. Threshold values are only required in active mode and only for dynamic VLRs corresponding to which no static VLR profile exists.

When a new static VLR profile entry is added to the static profile table, because routing node 100 picks the status of the VLR from the static entry, the status of the dynamic VLR entry does not matter. Accordingly, there is no need to update or delete an existing VLR entry. The dynamic entry will age out after a configurable time period if it is not used.

If an existing static VLR profile status is changed, there is likewise no need to update the dynamic profile entry because the static status controls. If a static VLR profile entry is deleted, no action is required with regard to the dynamic VLR status. The dynamic VLR status will remain unchanged.

As indicated above, dynamic learning may be performed for velocity checking by automatically learning what would be considered reasonable time periods for travel between foreign mobility management nodes. It is risky to learn "velocity" from an unknown or graylisted mobility management node as the communication from such a node may actually be from a hacker. Therefore, routing node 100 may learn velocity (or associated time period) only when one of the following criteria is met:

A message is received from a trusted mobility management node
    All mobility management nodes are trusted during learn mode, and only whitelisted mobility management nodes are trusted in other modes.
A static roaming entry to verify age of location is available in the static roaming table.

If learning is not possible based on above rules, routing node 100 should avoid learning time periods used for velocity checks. Otherwise, the velocity check for update location messages will become ineffective.

According to another aspect of the subject matter described herein, the minimum number of samples before routing node 100 considers a time period usable for a velocity check to be learned may be configurable by a network operator. To implement such configuration, routing node 100 may maintain the following parameter with the following configurable values:

Min samples for velocity check: Range [None, 1-MAX_INT32, default "None"]

"None" indicates continue learning. Any other value indicates when to transition from "learn" to "use".

This parameter is configured similar to the successful validation threshold and the failure validation threshold.

Given the above-listed rules about when to perform dynamic learning of the minimum time period for a velocity check and the value of the min samples for velocity check parameter, routing node 100 may select the minimum of all age of location samples for whitelisted mobility management nodes or for any mobility management nodes when operating in learn mode.

Before performing an age of location check, if the old mobility management node is not found in the dynamic roaming table, routing node 100 may add the old mobility management node to the dynamic profile table unless the old mobility management node status is blacklisted. If the old mobility management node status is blacklisted, then an entry will not be created in the dynamic profile table, and the velocity check results in a validation failure. In addition, if the current state of routing node 100 is active, a new entry for the old VLR may not be created in the dynamic profile table. If the mode is active, a new entry will not be created in the dynamic profile table for the old VLR.

Routing node 100 may perform the following steps for creating an entry for a mobility management node in the dynamic roaming table. No entry is required in the dynamic roaming table if the new mobility management node is whitelisted. No validation is performed on whitelisted mobility management nodes. Hence, an entry in the dynamic roaming table for a whitelisted node will be useless. A new entry will likewise not be added to the dynamic roaming table if the new VLR is blacklisted. Entries for blacklisted VLRs will not be added to the dynamic profile table, and hence entries for blacklisted nodes will not be added to the dynamic roaming table. In addition, an entry in the dynamic roaming table for a blacklisted node will be useless as no validation is performed on blacklisted VLRs. A new entry will likewise not be added to the dynamic profile table if the old mobility management node for the entry is blacklisted. There are no entries for blacklisted nodes in the dynamic profile table, and hence an entry cannot be created in the dynamic roaming table. A new entry will likewise not be added to the dynamic roaming table if the old VLR does not support the age of location parameter. Table 9 shown below illustrates the creation of dynamic entries in the dynamic profile table and the dynamic roaming table.

TABLE 9

Interactions Between Operational Modes of Routing Node 100 and Velocity Learning

| New VLR Status | Old VLR Status | SRT Exists | DRT Exists | Mode "OFF" | Learn Mode | Test Mode | Active Mode |
|---|---|---|---|---|---|---|---|
| WL | DC | DC | DC | Validation Success | Validation Success No DRT entry | Validation Success No DRT entry | Validation Success No DRT entry |
| BL | DC | DC | DC | Validation Failed | Validation Failed No DRT entry | Validation Failed No DRT entry | Validation Failed No DRT entry |
| GL | Not found | DC | DC | Old VLR not found error | Old VLR not found error Create DRT entry with AOL | Old VLR not found error Create DRT entry with AOL | Old VLR not found error No DRT entry |
|  | AOL not supported | DC | DC | Validation Error | Validation Error No DRT entry | Validation Error No DRT entry | Validation Error No DRT entry |
|  | BL | DC | DC | Validation Error | Validation Error No DRT entry | Validation Error No DRT entry | Validation Error No DRT entry |
|  | WL/GL | Yes | DC | Perform velocity check using SRT | Perform velocity check using SRT Create DRT entry with AOL | Perform velocity check using SRT Create DRT entry with AOL | Perform velocity check using SRT |
|  |  | No | No | Threshold not defined error | Validation Error Create DRT entry with AOL | Validation Error Create DRT entry with AOL | Validation Error |
|  |  | Yes (Learning) | No | Threshold not defined error | Validation Error Update AOL of DRT entry Increment threshold | Validation Error Update AOL of DRT entry Increment threshold | Validation Error |

TABLE 9-continued

Interactions Between Operational Modes of Routing Node 100 and Velocity Learning

| New VLR Status | Old VLR Status | SRT Exists | DRT Exists | Mode "OFF" | Learn Mode | Test Mode | Active Mode |
|---|---|---|---|---|---|---|---|
| | | | Yes (Learning Complete) | Threshold not defined error | Validation Error Update AOL of DRT entry Increment threshold | Perform velocity check Fail Action Id treated as FALLBACK | Perform velocity check |

Referring to the first row of Table 9, if the new VLR status is whitelisted, an entry is not created in the dynamic roaming table because validation testing is not performed. In the second row of Table 9, if the status of the new VLR is blacklisted, validation testing is not performed, and no entry is created for the VLR in the dynamic roaming table. In the third row of the first column of Table 9, if the status of the new VLR is gray listed, an entry in the dynamic roaming table may or may not be created depending on whether the old VLR supports age of location (AOL), the operational mode, and whether a status for the new VLR exists in the static and dynamic roaming tables.

Figure 5:
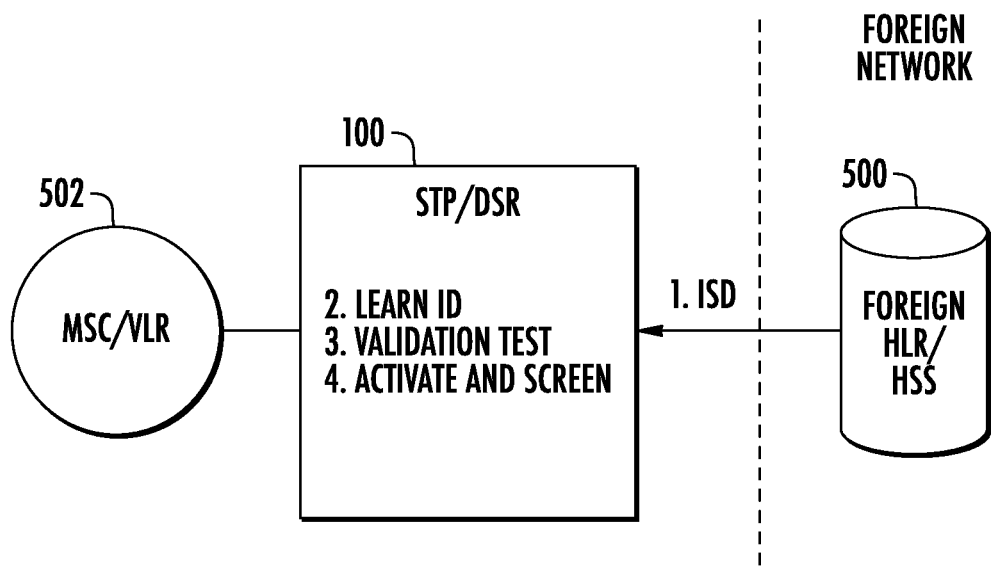
FIG. 5 is a message flow diagram illustrating operation of the routing node illustrated in FIG. 1 for automatically learning the identity of a foreign HLR.

As stated above, routing node 100 may also be capable of learning foreign HLR or HSSs identities, updating a security database using dynamically learned foreign HLR or HSS identities, and using the dynamically learned information to screen messages from foreign HLRs or HSSs. FIG. 5 is a network and message flow diagram illustrating the screening of messages from a foreign HLR or HSS. Referring to FIG. 5, routing node 100 may receive an insert subscriber data (ISD) message from a foreign HLR or HSS 500. Routing node 100, when operating in learn mode, may learn the ID of foreign HLR or HSS 500 and forward the ISD message to MSC/VLR 502. When operating in test mode, routing node 100 may challenge foreign HLR or HSS 500 by sending a message to foreign HLR or HSS 500 and receiving a response. Routing node 100 may build a score based on the content of the response received from foreign HLR or HSS 500. Based on results of repeated testing, routing node 100 may set the status of foreign HLR or HSS 500 to whitelisted, blacklisted, or graylisted. In the active mode, routing node 100 may screen messages from foreign HLR or HSS 500 based on the status of the entry that was learned during learn mode.

Figure 6:
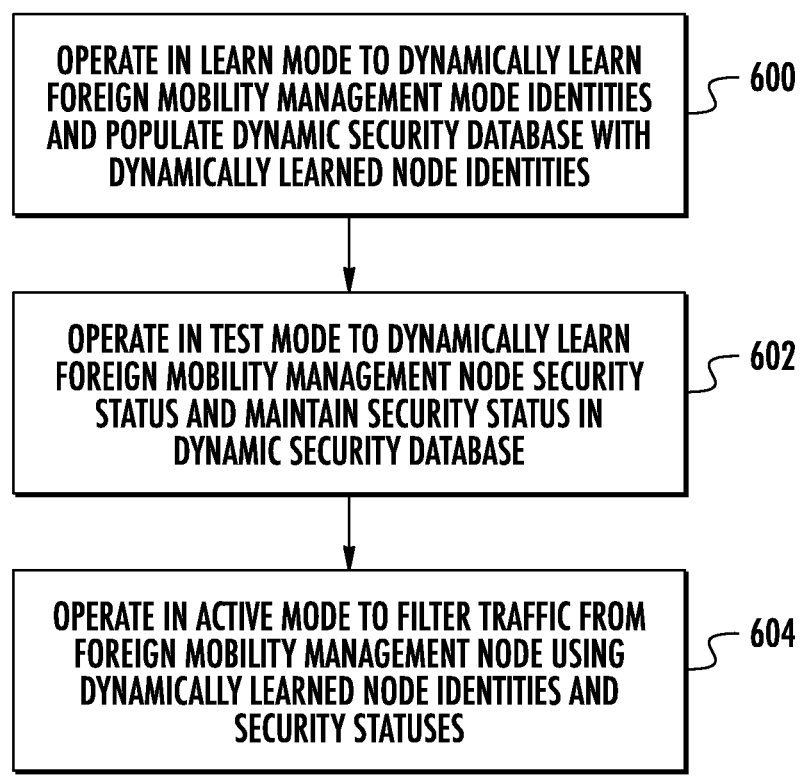
FIG. 6 is a flow chart illustrating exemplary overall operation of the routing node illustrated in FIG. 1 in dynamically learning and using foreign telecommunications network mobility management node information.

FIG. 6 is a flow chart illustrating an exemplary overall process that may be implemented by routing node 100 in performing dynamic learning of foreign mobility management node identification information, dynamically learning the security status of the node, populating a security database with the node identification information and the status, and using the security database to screen messages. Referring to FIG. 6, in step 600, routing node 100 operates in the learn mode to dynamically learn from foreign mobility management node identities and populates the security database with dynamically learned node identities. As stated above with regard to FIG. 2, operating in learn mode includes adding node identities to the dynamic profile table and challenging the HLR to identify old and new VLRs. Dynamic roaming table entries may also be created. Traffic is forwarded to its destination without performing security screening.

In step 602, routing node 100 operates in the test mode to dynamically learn foreign mobility management node security status and maintains the security status in the security database. As described above with regard to FIG. 3, operating in the test mode includes performing VLR validations for Category 3.1 traffic, velocity check, and international mobile equipment identity (IMEI) validation for Category 3.2, creating new entries in the dynamic profile table with graylisted status and updating the status of the entries as validation pass and fail counts change. Dynamic roaming table entries are also created. VLR validation includes comparing the calling party address (CgPA) of a Category 3.1 message received by routing node 100 with the location of the subscriber stored in the HLR. If the location is the same, it can be concluded that the message is coming from the current VLR and the message is valid. If the location is different than the CgPA of the message, then the VLR validation fails. IMEI validation may be performed as described in commonly-assigned, co-pending U.S. patent application Ser. No. 16/024,422, filed Jun. 29, 2018, the disclosure of which is incorporated herein by reference in its entirety. Briefly, IMEI validation may include having routing node 100 query the MSC or HLR (that in turn queries the MSC using the provide subscriber information (PSI) operation) to provide the IMEI of the subscriber. If the MSC is whitelisted, routing node 100 may store the IMEI-IMSI pair for future use. If the MSC is graylisted, routing node 100 may use the earlier stored IMEI-IMSI pair for validation of the graylisted MSC.

Even though the learn and test modes are described herein as separate modes, the subject matter described herein is not limited to such an implementation. Routing node may operate in the test and learn modes simultaneously to learn new node identities and perform validation testing for the newly learned node identities without departing from the scope of the subject matter described herein. In addition, the routing node could also operate in the test, learn, and active modes simultaneously to dynamically learn new node identities, perform validation testing of the newly learned node identities, and filter traffic using the dynamically learned security status.

In step 604, routing node 100 operates in active mode to filter traffic from foreign mobility management nodes using the dynamically learned node identities in statuses. As stated above with regard to FIG. 4, operating in the active mode includes filtering received traffic from foreign mobility management nodes based on the status of the entries in the static and dynamic profile tables. Validation counts are updated, and velocity learning is also performed.

In the examples described above, dynamically learning the status of a mobility management node is performed by updating validation pass and fail counts as well as time thresholds for foreign mobility management nodes. However, the subject matter described herein is not limited to performing validations only by comparing validation counts to thresholds. In another example, the security status may be learned or security screening implemented using a machine learning algorithm, for example, as implemented by a neural network. The machine learning algorithm may be supervised or unsupervised, depending on whether ground truth data is available for training. In one implementation, a neural network may be trained to identify attack versus non-attack traffic, and the trained neural network may be used to classify traffic in real time without expressly computing a node status or score.

Using machine learning techniques to dynamically learn and update the security status of a foreign mobility management node may be possible if the hardware used to process messages is sufficiently fast to support machine learning. Alternatively, the machine learning of a node's security status may be performed using cloud resident hardware, and the security status may be updated in on premises routing node hardware using the status learned by the cloud based hardware.

In the examples described above, foreign mobility management nodes are assigned a security status of graylisted, blacklisted, or whitelisted. However, the subject matter described herein is not limited to only these categories of security status. In an alternate implementation, a foreign mobility management node may be assigned a numeric security score based on results of the validation testing. If the security score indicates that a particular node is a security risk, during the active mode of operation, messages from that node may be blocked and flagged for further analysis or passed and flagged for further analysis.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for dynamically learning and using foreign mobility management node information for telecommunications network security screening, the method comprising:
   operating a telecommunications network routing node in a learn mode in which traffic from foreign mobility management nodes is received and identities of the foreign mobility management nodes are learned and used to populate a security database maintained by the telecommunications network routing node;
   operating the telecommunications network routing node in a test mode to dynamically learn foreign mobility management node security status and maintaining the security status for the foreign mobility management nodes in the security database;
   operating the telecommunications network routing node in an active mode to filter traffic from the foreign mobility management nodes using the dynamically learned node identities and security statuses; and
   providing, in the security database, a static profile table for overriding dynamic learning of foreign mobility management node identities, wherein the telecommunications network routing node routes or blocks messages from foreign mobility management nodes based on the security status stored in the static profile table.

2. The method of claim 1 wherein operating the telecommunications network routing node in a learn mode includes querying a home location register (HLR) or home subscriber server (HSS) to identify an old mobility management node and an age of location parameter and populating the security database with an entry corresponding to the old mobility management node and the age of location parameter.

3. The method of claim 1 wherein operating the telecommunications network node in the learn mode includes performing validation testing for mobility management node identities extracted from received messages, updating validation pass and fail counts in the security database based on results of the validation testing, and updating the security statuses based on the validation pass and fail counts.

4. The method of claim 1 wherein operating the telecommunications network routing node in the active mode includes receiving messages from foreign mobility management nodes, performing lookups in the security database using mobility management node identities extracted from the messages, and blocking or passing the messages based on the dynamically learned security status for the node identities stored in the security database.

5. The method of claim 1 wherein the telecommunications network routing node comprises a signal transfer point (STP).

6. The method of claim 1 wherein the telecommunications network routing node comprises a Diameter signaling router (DSR).

7. The method of claim 1 wherein operating the telecommunications network node in the test mode includes dynamically learning a security status of a foreign home location register (HLR) or home subscriber server (HSS).

8. The method of claim 7 wherein operating the telecommunications network routing node in the active mode includes using the dynamically learned security status of the foreign HLR or HSS to filter traffic from the foreign HLR or HSS.

9. A method for dynamically learning and using foreign mobility management node information for telecommunications network security screening, the method comprising:
   operating a telecommunications network routing node in a learn mode in which traffic from foreign mobility management nodes is received and identities of the foreign mobility management nodes are learned and used to populate a security database maintained by the telecommunications network routing node;
   operating the telecommunications network routing node in a test mode to dynamically learn foreign mobility management node security status and maintaining the security status for the foreign mobility management nodes in the security database; and
   operating the telecommunications network routing node in an active mode to filter traffic from the foreign mobility management nodes using the dynamically learned node identities and security statuses, wherein operating the telecommunications network routing node in the learn mode includes dynamically learning time parameters usable for velocity checks between old and new foreign mobility management nodes.

10. A system for dynamically learning and using foreign mobility management node information for telecommunications network security screening, the system comprising:

a telecommunications network routing node including at least one processor and a memory;

a security database located in the memory; and a dynamic learning and screening module implemented by the at least one processor for operating in a learn mode in which traffic from foreign mobility management nodes is received and identities of the foreign mobility management nodes are learned and used to populate the security database, operating in a test mode to dynamically learn foreign mobility management node security status and maintaining the security status for the foreign mobility management nodes in the security database, and operating in an active mode to filter traffic from the foreign mobility management nodes using the dynamically learned node identities and security statuses, wherein the security database includes a static profile table for overriding dynamic learning of foreign mobility management node identities, wherein the routing node routes or blocks messages from foreign mobility management nodes based on the security status stored in the static profile table.

11. The system of claim 10 wherein operating in the learn mode includes querying a home location register (HLR) or home subscriber server (HSS) to identify an old mobility management node and an age of location parameter and populating the security database with an entry corresponding to the old mobility management node and the age of location parameter.

12. The system of claim 10 wherein operating in the learn mode includes performing validation testing for mobility management node identities extracted from received messages, updating validation pass and fail counts in the security database based on results of the validation testing, and updating the security statuses based on the validation pass and fail counts.

13. The system of claim 10 wherein operating in the active mode includes receiving messages from foreign mobility management nodes, performing lookups in the security database using mobility management node identities extracted from the messages, and blocking or passing the messages based on the dynamically learned security status for the node identities stored in the security database.

14. The system of claim 10 wherein the telecommunications network routing node comprises a signal transfer point (STP).

15. The system of claim 10 wherein the telecommunications network routing node comprises a Diameter signaling router (DSR).

16. The system of claim 10 wherein operating in the test mode includes dynamically learning a security status of a foreign home location register (HLR) or home subscriber server (HSS) and wherein operating the telecommunications network routing node in the active mode includes using the dynamically learned security status of the HLR or HSS to filter traffic from the foreign HLR or HSS.

17. A system for dynamically learning and using foreign mobility management node information for telecommunications network security screening, the system comprising:

a telecommunications network routing node including at least one processor and a memory;

a security database located in the memory; and a dynamic learning and screening module implemented by the at least one processor for operating in a learn mode in which traffic from foreign mobility management nodes is received and identities of the foreign mobility management nodes are learned and used to populate the security database, operating in a test mode to dynamically learn foreign mobility management node security status and maintaining the security status for the foreign mobility management nodes in the security database, and operating in an active mode to filter traffic from the foreign mobility management nodes using the dynamically learned node identities and security statuses, wherein operating in the learn mode includes dynamically learning time parameters usable for velocity checks between old and new foreign mobility management nodes.

18. A non-transitory computer readable medium having stored thereon executable instructions that when executed by a processor of a computer control the computer to perform steps comprising:

operating a telecommunications network routing node in a learn mode in which traffic from foreign mobility management nodes is received and identities of the foreign mobility management nodes are learned and used to populate a security database maintained by the telecommunications network routing node;

operating the telecommunications network routing node in a test mode to dynamically learn foreign mobility management node security status and maintaining the security status for the foreign mobility management nodes in the security database;

operating the telecommunications network routing node in an active mode to filter traffic from the foreign mobility management nodes using the dynamically learned node identities and security statuses; and providing, in the security database, a static profile table for overriding dynamic learning of foreign mobility management node identities, wherein the telecommunications network routing node routes or blocks messages from foreign mobility management nodes based on the security status stored in the static profile table.

* * * * *

UNITED STATES PATENT AND TRADEMARK OFFICE
CERTIFICATE OF CORRECTION

PATENT NO. : 10,952,063 B2
APPLICATION NO. : 16/379488
DATED : March 16, 2021
INVENTOR(S) : Mehta It is certified that error appears in the above-identified patent and that said Letters Patent is hereby corrected as shown below:

On the Title Page

On page 2, Column 2, item (56) under Other Publications, Line 8, delete "(Unpubllshed," and insert -- (Unpublished, --, therefor.

On page 3, Column 1, item (56) under Other Publications, Line 19, delete "Decisison" and insert -- Decision --, therefor.

On page 3, Column 2, item (56) under Other Publications, Line 46, delete ""Digitial" and insert -- "Digital --, therefor.

On page 3, Column 2, item (56) under Other Publications, Line 56, delete "12/823,55S" and insert -- 12/823,559 --, therefor.

On page 3, Column 2, item (56) under Other Publications, Line 67, delete "Monile" and insert -- Mobile --, therefor.

On page 4, Column 1, item (56) under Other Publications, Line 40, delete "Internatioanl" and insert -- International --, therefor.

On page 5, Column 1, item (56) under Other Publications, Line 10, delete "Inteview" and insert -- Interview --, therefor.

In the Drawings

On sheet 2 of 5, in FIG. 2, under Reference Numeral 202, Line 1, delete "VISTED" and insert -- VISITED --, therefor.

On sheet 3 of 5, in FIG. 3, under Reference Numeral 202, Line 1, delete "VISTED" and insert -- VISITED --, therefor.

Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,952,063 B2

On sheet 4 of 5, in FIG. 4, under Reference Numeral 202, Line 1, delete "VISTED" and insert -- VISITED --, therefor.

In the Specification

In Column 4, Line 55, delete "STP." and insert -- STP --, therefor.

In Column 17, Line 23, delete "gray listed," and insert -- graylisted, --, therefor.

In Column 19, Line 20, delete "in on" and insert -- in --, therefor.